United States Patent [19]

Alletrux

[11] 4,253,526
[45] Mar. 3, 1981

[54] HORSE SHOE

[76] Inventor: Marcel F. L. Alletrux, Breuil Barret, 85120 La Chataigneraie, France

[21] Appl. No.: 967,977

[22] Filed: Dec. 11, 1978

[30] Foreign Application Priority Data

Dec. 14, 1977 [FR] France ................................. 77-37724

[51] Int. Cl.³ .............................................. A01L 7/04
[52] U.S. Cl. ......................................... 168/4; 168/24; 168/29
[58] Field of Search .................. 168/4, 24, 29, DIG. 1

[56] References Cited

U.S. PATENT DOCUMENTS

| | | | |
|---|---|---|---|
| 445,481 | 1/1891 | Tipton | 168/24 |
| 738,144 | 9/1903 | Agnew et al. | 168/24 |
| 914,015 | 3/1909 | Brislin | 168/4 |
| 1,191,984 | 7/1916 | Neil | 168/29 |
| 3,425,493 | 2/1969 | Kulak | 168/4 |
| 3,548,947 | 12/1970 | Makay-Smith | 168/29 |
| 3,957,120 | 5/1976 | Alletrux | 168/4 |

Primary Examiner—Hugh R. Chamblee
Attorney, Agent, or Firm—Holman & Stern

[57] ABSTRACT

A horse shoe is disclosed comprising on its underface intended for engagement with the ground a rib along at least part of its inner edge, made of a plastically deformable material, the rib being formed with an extra thickness extending substantially from the rear third of the horse shoe up to its medium portion.

4 Claims, 6 Drawing Figures

HORSE SHOE

BRIEF SUMMARY OF THE INVENTION

The present invention relates to a horse shoe formed with a platform which is wider than the thickness of the horse's foot wall, with its under face formed with an inner rib.

Such horse shoes are known for example from U.S. Pat. No. 3,957,120. Their solidity and their adaptation to the horse's foot are not always sufficient.

It is an object of the invention to provide an embodiment of such a horse shoe offering a remarkable solidity and allowing nevertheless to use the morphology of the horse's foot to the best.

Horse shoes according to the invention and fitted on a horse protect the latter efficiently as regards impacts occuring after the contact of the horse shoes on the ground.

The horse shoe according to the invention is characterized in that it is made of a plastically deformable material, and in that the rib has an extra thickness extending between the medium portion of the horse shoe and the posterior third portion of the latter.

Due to the fact as such that the horse shoe is worn by the horse, the extra thickness formed by the horse shoe causes deformation of the latter and provides an excellent adaptation of the horse shoe to the under face of the horse's foot. Moreover, this extra thickness allows in connection with the deformability of the horse shoe an adaptation of said horse shoe to the horse's foot while shoeing the horse.

A horse shoe according to the invention is also remarkable in that it has thinned out calkins.

Such a horse shoe brings fully into play the damping and anti-skidding function attached to the frog of an unshoed horse's foot.

BRIEF DESCRIPTION OF THE SEVERAL VIEWS OF THE DRAWINGS

The invention will become more apparent from the following description given as examplification and with reference to the accompanying drawings wherein.

DETAILED DESCRIPTION

Figure 1:
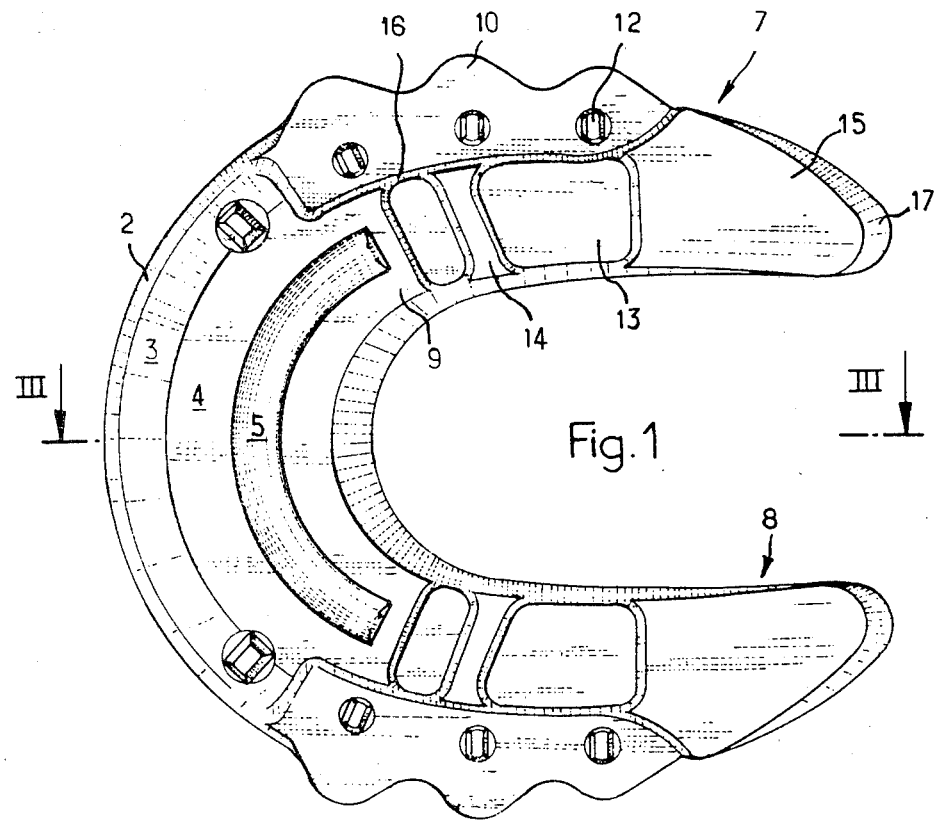
FIG. 1 is a view of the under face of a first embodiment of the horse shoe which comes in contact with the ground.

According to a first embodiment, the horse shoe (FIG. 1) which is symmetrical relative to axis III is formed with a front portion in the shape of a circular ring sector extending over a centre angle of about 100°, of substantially constant cross-section which, from the plane platform 1 of the horse shoe (FIG. 3) intended for coming in contact with the horse's foot, is formed with a side 2 provided with a front edge for engagement with the hoof front of the horse's foot and which is connected via a bevel 3 with the edge of a plane portion 4 which is substantially parallel with platform 1 and wherein is formed a groove 5, particularly a semi-circular groove, the opposite edge of the plane portion 4 being connected with platform 1 through an inclined flank 6.

The front portion in the shape of a circular ring is continued towards the rear by two branches 7, 8, slightly curved towards axis III, formed each with an inner rib 9 of substantially rectangular cross-section, the under surface of which is situated in prolongation of the plane portion 4, and an outer portion 10 in the shape of a thin plane wall 11 (FIG. 2) the outside edge of which is festooned and wherein are provided nail holes 12, for instance three in number, at the level of the wider portions of the plate.

An extra nail hole 12' is provided ahead of the plates 11 in the bevelled surface 3. Said nail holes are, in a plane parallel with platform 1, of rectangular cross-section, the sides with the larger dimension being directed substantially perpendicular to the branches of the horse shoe, and flare out from platform 1, particularly along the sides of the nail hole which are parallel to the branches.

The same horse shoe may then be attached indifferently to the four feet of a horse without a distinction to be made between right feet and left feet and/or front feet or rear feet of the horse. In fact, it is enough to use a fixation nail the blade of which has a thickness corresponding to the width of the nail hole, and therefore shorter than the length of the latter, the nail being in a position which is more or less close to axis III and its inclination being also changeable as to needs in a plane transverse to the branches.

The festoons formed in plate 11 may be, when the horse shoe is fixed on the horse's foot, either cut away or folded back upwards so as to ensure a better fixation of the horse shoe on the horse's foot.

The plate 11 is connected with rib 9 via an edge 16 which is substantially parallel to the inside edge of the horse shoe, and which in its front portion extends at right angles towards the outside for limiting the bevel 3 and the front portion of the plane surface 4, and which curves towards the outside in its rear portion adjacent the calkins 15 of the horse shoe.

The calkins, that is the portions of branches 7, 8 extending over approximately the rear third of the horse shoe, have a thickness which decreases up to an inclined edge 17 forming the rear ends of the branches.

A boss 13 extends towards the front on the inner rib 9 of the branches from the anterior limit of the calkins 15 up to the medium portion of the horse shoe and may even be extended slightly past the medium portion of the horse shoe towards the front as shown on FIG. 1.

Anti-skidding grooves may be provided on the under surface of the horse shoe in the form of a groove 5 in the shape of an arc of a circle formed in the front portion of the horse shoe in the plane surface 4, as well as in the shape of a groove 14 of U-shaped cross-section, the depth of which is substantially equal to the height of boss 13, and which is provided on the front portion of the latter transversly to the branches.

The horse shoe according to the invention is made of a plastically deformable material, in plastics or in a molded metallic material. In the latter case, the invention foresees to use advantageously an aluminium alloy such as that manufactured and sold by the PECHINEY Company under the name of AG3T.

Said alloy comprises, further to aluminium, magnesium as well as iron in lesser proportions. The compound comprises typically less than 2.5 to 3.5% of magnesium, less than 0.50% of iron, less than 0.50% of silicium, less than 0.10% of copper, less than 0.20% of zinc, less than 0.50% of manganesium, less than 0.005% of nickel and less than 0.005% of lead. In spite of its relative plasticity, it offers the particularity of forming under the effect of moisture a hard surface with a good resistance to abrasion, which is favourable to a long life of the horse shoe, the surface being on the other hand little oxidizable, whereby it can be put in contact with the horse's foot without disadvantage.

The bosses 13 formed on the horse shoe according to the invention allow a good rocking movement of the horse shoe on the ground, said movement being assisted on the one hand by the bevelled surface 3 and on the other hand by the thinned out calkins 15. They also allow, due to the plasticity of the horse shoe, an adaptation of the central inner portion of the two branches 7, 8 to the concave side surfaces of the horse's foot sole.

Thus, the weight of the horse bears not only on the hard wall or crust surrounding the horse's foot, but also on the inner portions of the horse's foot, viz. the side portions of the sole.

Moreover, the bosses 13 prevent the tipping axis of the horse's foot, particularly when stopped, to be shifted towards the rear under the effect of the thinned out calkins 15.

On the other hand, the latter allow the coming in contact of the frog or heel of the horse's foot with the ground, and allow therefore to benefit from the elasticity of the frog and from its damping effect when the hoof engages the ground.

The horse shoe according to the second embodiment (FIG. 4), symmetrical relative to axis V, has a front portion which is substantially in the shape of a semi circle, continued towards the rear by two branches 21, 22 in contact through their inner front portions and the width of which decreases progressively towards the rear.

The calkins 23 of the horse shoe, viz. the rear portions of branches 21, 22 are in the shape of a thin plate connected via an edge 25 to a boss 26 transverse to the branches, of trapezoidal cross-section, the direction of which is slightly inclined outwardly and forewardly, which is slightly off-set rearwardly relative to the medium portion of the horse shoe, and the thickness of which increases progressively from the periphery towards the axis of symmetry V. Said boss is continued in the front direction by a rib 27 of trapezoidal cross-section positioned along the inner edge of the branches up to the semi circle front portion of the horse shoe, with a thickness decreasing progressively forewardly, and then flares out sideways with symmetrical side edges 28 in the front portion of the horse shoe.

Between boss 26 and the side edge 28, the outside central portion of the horse shoe is in the shape of a plate 29, the thickness of which is substantially equal to the thickness of calkin 23, and is formed with nail holes 30 provided for the fixation with nails of the horse shoe on the horse's foot, spaced along the peripheral edge of plate 29. An extra nail hole may be provided in the peripheral portion of the side edge 28.

Figure 4:
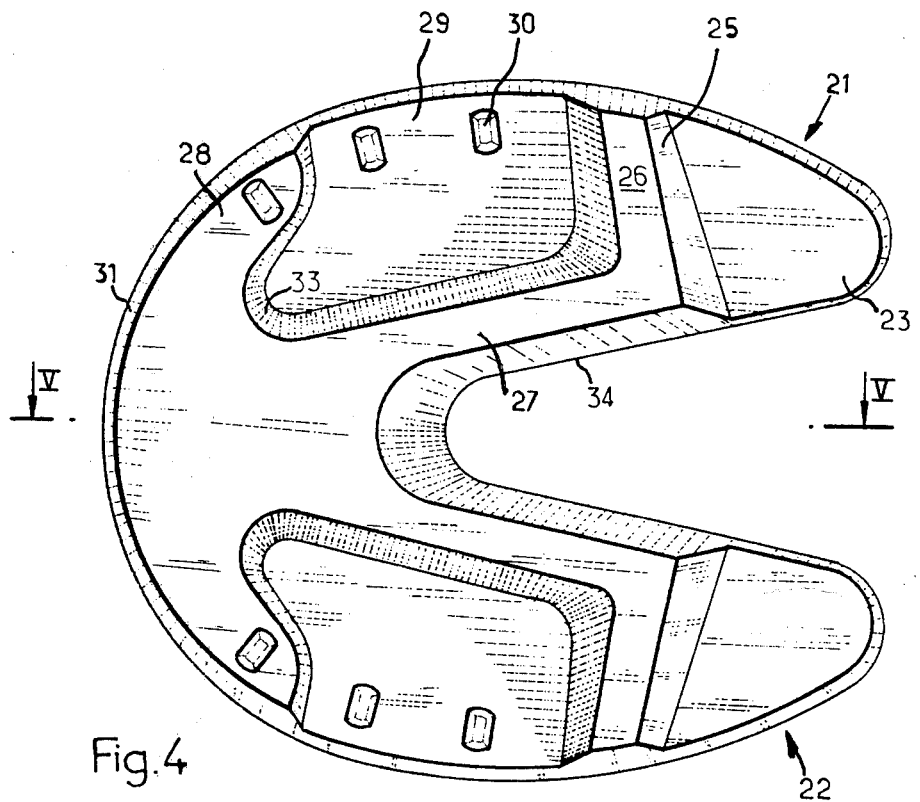
FIG. 4 is a view from underneath of a second embodiment of the horse shoe according to the invention.

The surface 33 connecting edge 28 with plate 29 has, from rib 27, a curvilinear S shape towards the outside as shown in FIG. 4.

The front portion of the horse shoe which is intended for engaging the front of the horse's foot, ends with an edge 31 which is thicker than plate 29 and is connected to a plane face 32 (FIG. 5) forming the portion of the horse shoe which is intended to be in contact with the foot of the animal.

The materials used with the first embodiment of the horse shoe according to the invention may also be used advantageously with the horse shoe according to this second embodiment.

Such a horse shoe is different from the horse shoe of the first embodiment substantially in that the transverse width of branches 21 and 22 is larger, said width being sufficient for the inside protruding portion 27 of its branches to come opposite the bars of the horse's foot forming forwardly a continuation of the foot wall or crust on either side of the hoof frog. The whole morphological structure of the foot is thereby called upon for sustaining the horse's weight.

Figure 5:
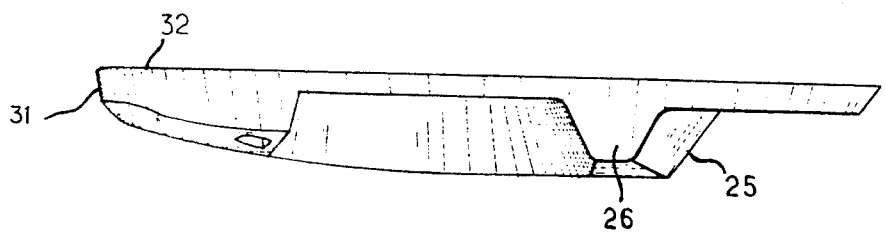
FIG. 5 is a side view of the horse shoe according to FIG. 4.

The transverse boss 26 has an anti-skid function which may be also assumed by grooves formed in the raised portions 27 and 28 of the horse shoe, and which have not been shown in FIGS. 4 and 5.

Figure 2:
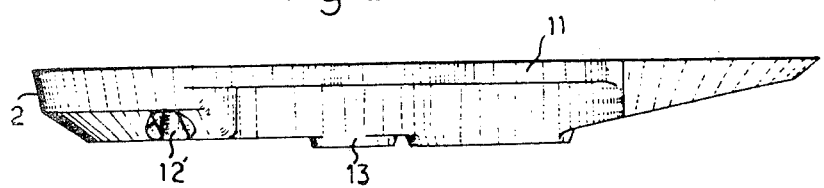
FIG. 2 is a side view of the horse shoe of FIG. 1.
Figure 3:
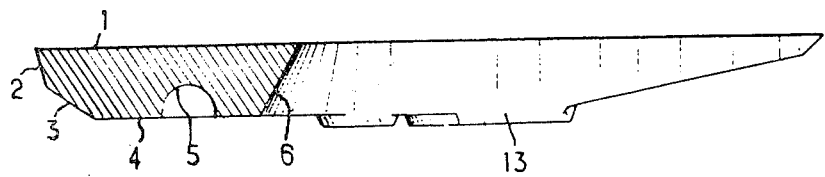
FIG. 3 is a cross-sectional view along axis III—III of FIG. 1.

The other constituent elements of this second embodiment have the same function as in the embodiment described with reference to FIGS. 1 to 3.

According to an alternative embodiment (not shown), the rib 27 is continued with a slightly decreasing thickness up to the rear portion of the horse shoe. The transverse boss 26 is in this case cut away, the position of the extra thickness of the rib 27 not being modified.

Figure 6:
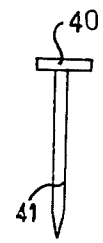
FIG. 6 is a side view of a nail used for fixing a horse shoe according to the invention.

For fitting a horse shoe according to the invention on the foot of a horse, one uses preferably in the nail holes provided in the thin plates 11, 29 a nail (FIG. 6) formed with a thin flat head 40, for instance of rectangular shape, continued by a blade or stem 41 tapering at its free end. The use of such a nail is made possible on the one hand by the small thickness of the plates in which are formed the nail holes receiving the nails and on the other hand by the fact that once it is fitted on the horse's foot, the head 40 of the nails is not in direct contact with the ground and is therefore not subject to high mechanical stresses.

With the nail holes formed on the thick portions of the horse shoe, one uses a normal flanged shoeing nail. However, even in this case, the position and transverse inclination of the nail in the nail hole may be adapted to the foot to be shoed.

The drawings and specification present a detailed disclosure of a preferred embodiment of the invention, and it is to be understood that the invention is not limited to the specific forms disclosed, but covers all modifications changes and alternative constructions falling within the scope of the invention as defined by the claims.

I claim:

1. A horse shoe comprising a crescent shape plate with two heels, a toe, an inner edge, an upper face intended for engaging with the horse hoof wall and sole, and an underface, a lower rib of substantially rectangular cross-section on said underface extending along said inner edge, the plate and the rib being made of a plastically deformable material, wherein the rib has heel portions of reduced thickness which are suppressed and a portion of increased thickness extending in front of the heel portion substantially from the rear third of the horse shoe up to its medium portion, said rib extending in the rear third portion transversely to the inner edge.

2. The horse shoe of claim 1, wherein the toe portion of the shoe has a substantially uniform thickness.

3. A horse shoe comprising a crescent shape plate with two heels, a toe, an inner edge, an upper face intended for engaging with a horse hoof wall and sole, and an underface, a lower rib of substantially rectangular cross-section on said underface extending along said inner edge, the plate and the rib being made of aluminum alloy of magnesium, wherein the rib has heel portions of reduced thickness and a portion of increased thickness extending in front of the heel portions substantially from the rear third of the horse shoe to its medium portion.

4. The horse shoe of claim 3, wherein said alloy also comprises iron, silicium, copper, zinc, magnesium, nickel and lead.

* * * * *